(12) United States Patent
Peck

(10) Patent No.: US 8,948,896 B2
(45) Date of Patent: Feb. 3, 2015

(54) AUDIO RECORDER AND PLAYER FOR PERSONS WITH IMPAIRED VISION

(76) Inventor: Gerald W. Peck, Saint Simons Island, GA (US)

( * ) Notice: Subject to any disclaimer, the term of this patent is extended or adjusted under 35 U.S.C. 154(b) by 772 days.

(21) Appl. No.: 13/232,017

(22) Filed: Sep. 14, 2011

(65) Prior Publication Data

US 2012/0065752 A1 Mar. 15, 2012

Related U.S. Application Data

(60) Provisional application No. 61/382,601, filed on Sep. 14, 2010.

(51) Int. Cl.
*G06F 17/00* (2006.01)
*G09B 21/00* (2006.01)

(52) U.S. Cl.
CPC .................................... *G09B 21/006* (2013.01)
USPC ............................................................ 700/94

(58) Field of Classification Search
CPC ... G06F 3/0213; G06F 3/219; G06F 3/03543; G06F 3/0216; H04N 2005/4428; H04N 21/42222
See application file for complete search history.

(56) References Cited

U.S. PATENT DOCUMENTS

| | | | |
|---|---|---|---|
| 5,491,497 A * | 2/1996 | Suzuki ......................... | 345/157 |
| 6,088,022 A * | 7/2000 | Rakoski ........................ | 345/168 |
| 6,802,662 B1 * | 10/2004 | Cheng et al. ................. | 400/489 |
| 8,138,942 B2 * | 3/2012 | Otsuka et al. ............ | 340/815.78 |
| 2005/0105951 A1 * | 5/2005 | Risheq ........................ | 400/472 |
| 2009/0241052 A1 * | 9/2009 | Ha et al. ....................... | 715/772 |
| 2010/0105480 A1 * | 4/2010 | Mikhailov et al. ............. | 463/38 |

* cited by examiner

*Primary Examiner* — Andrew C Flanders
(74) *Attorney, Agent, or Firm* — Jonathan R. Smith; Jonathan Rigdon Smith, J.D., PC

(57) ABSTRACT

A sound recorder and player has a main body that is shaped to be held in the palm of either the right or left hand, with finger grips that associate recorder/player functions with each finger of the hand. A principal tactile feature enables the user to identify quickly the orientation of the device with respect to a person's thumb. The device is compact so as to minimize space requirements for carrying it, and it is rounded both for comfort in the hand and to reduce snagging and potential difficulty in removing it from, or putting it into, a pocket or bag.

16 Claims, 3 Drawing Sheets

AUDIO RECORDER AND PLAYER FOR PERSONS WITH IMPAIRED VISION

BACKGROUND OF THE INVENTION

The invention of sound recorders and players was especially significant to persons with impaired vision as a substitute for or supplement to writing and reading. This is especially true with the advent of portable and pocket-sized devices. While a person can learn the position of the various controls on a pocket recorder by touch, such recorders are not designed specifically to help the sight-impaired.

SUMMARY OF THE INVENTION

The present invention is a sound recorder and player that can be operated easily entirely by feel. It comprises a main body that is shaped to be held in the palm of either the right or left hand, with finger grips that associate recorder/player functions with each finger of the hand. A principal tactile feature enables the user to identify quickly the orientation of the device with respect to a person's thumb. Another inventive feature is that the device is compact so as to minimize space requirements for carrying it, and it is rounded both for comfort in the hand and to reduce snagging and potential difficulty in removing it from, or putting it into, a pocket or bag.

DETAILED DESCRIPTION OF THE INVENTION

Figure 1:
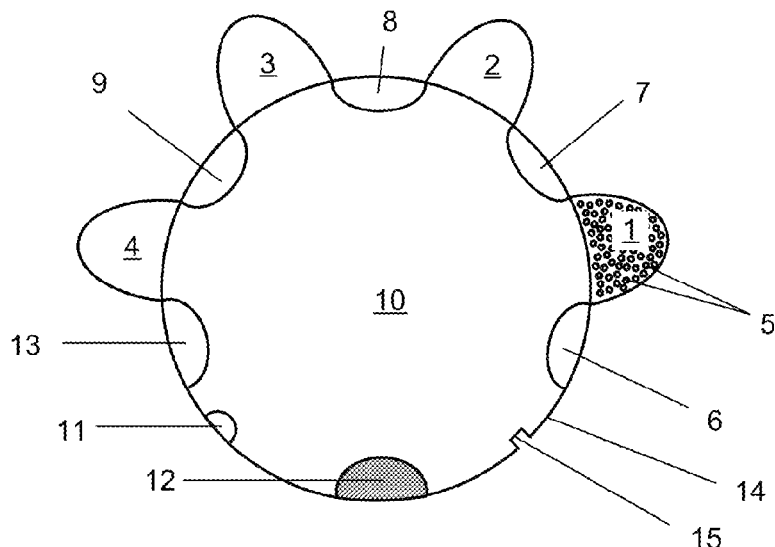
FIG. 1 is a front view of the present invention.

The following is a detailed description of the drawings, in which like features are represented by like reference characters in each of the drawings. FIG. 1 is a front view of the present invention showing a substantially spherical body 10 containing recording and playback components well known in the arts. Projecting outwardly from the body 10 is a first, thumb-orienting nub 1, a second orienting nub 2, a third orienting nub 3, and a fourth orienting nub 4.

The first nub 1 is covered with mini-nubs 5 (only two of many referenced in this view) which provide a recognizable texture to the first nub 1. The first nub 1 is positioned as the end-most nub in the series of four nubs. A vision-impaired person can identify the first, thumb-orienting nub 1 by the feel of its mini-nubs 5. Thus, a vision-impaired person can tell that he/she should position his/her thumb, right or left hand, on the side of the first nub 1 opposite the second nub 2. The other fingers then naturally fall in place with the index finger lying between the first nub 1 and the second nub 2, etc. Means of distinguishing the first nub from the rest of the nubs by tactile feel other than by the use of mini-nubs, such as by, e.g., flattening of the top of the first nub, also fall within the scope of this invention.

The invention also includes function buttons on the surface of the body 10 which can be manipulated by a user's fingers to cause the device to perform necessary record/playback functions. Just clockwise in this view from the nub 1 is a record button 6. Between the nub 1 and the nub 2 is a stop button 7. A play button 8 is between the nub 2 and the nub 3. A fast forward button 9 is between the nub 3 and the nub 4. Counterclockwise from the nub 4 is a rewind button 13. Further counterclockwise from the rewind button 13 is a delete button 11. A speaker grille 12 covering a speaker is at the bottom. Clockwise from the nub 1 is an electronic, e.g., USB, port 15. A sight-impaired user who desires to use this port will be able to distinguish its character and identity by its shape.

The centroids of all of the above features (except the nubs 1-4 and mini-nubs 5) lie along a great circle of the body 10, which appears in this view as the circumference of the circle 14. This makes the invention bilaterally symmetrical, namely, that the rear view is a mirror image of this front view, rendering the invention operable by left-handed and right-handed persons with equal facility.

Figure 2:
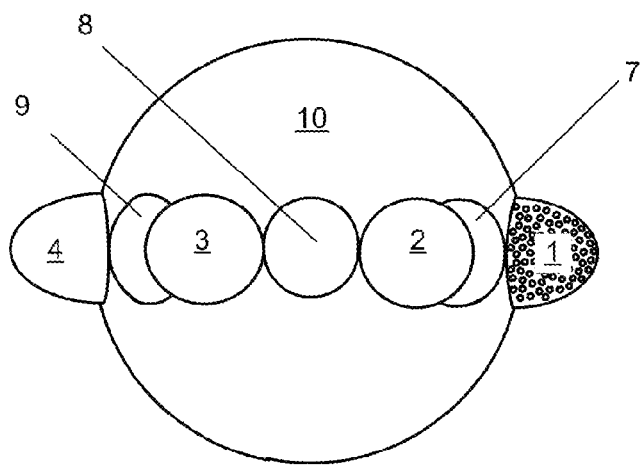
FIG. 2 is a top view of the present invention.

FIG. 2 is a top view of the present invention, identifying the same elements as identified in FIG. 1 that are visible from the top.

Figure 3:
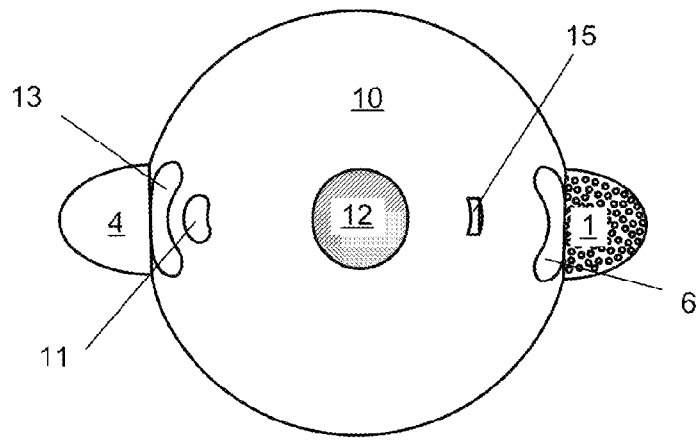
FIG. 3 is a bottom view of the present invention.

FIG. 3 is a bottom view of the present invention identifying the same elements as identified in FIG. 1 that are visible from the bottom.

Figure 4:
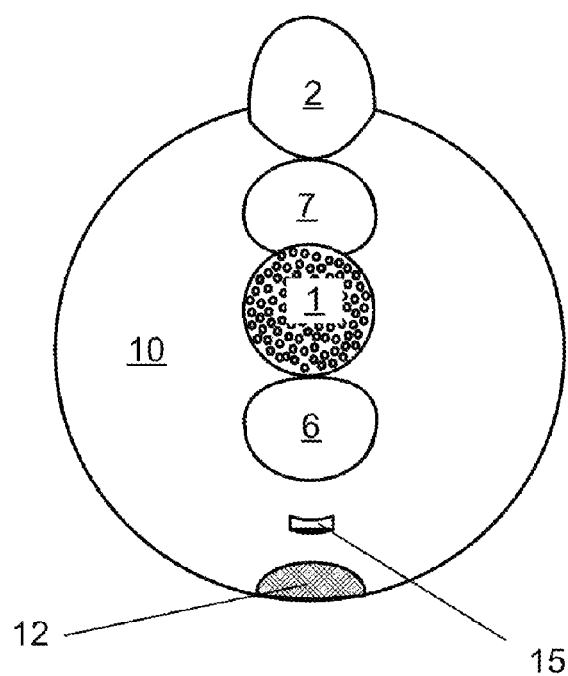
FIG. 4 is a right side view of the present invention.

FIG. 4 is a right side view of the present invention identifying the same elements as identified in FIGS. 1 and 2 that are visible from the right side.

Figure 5:
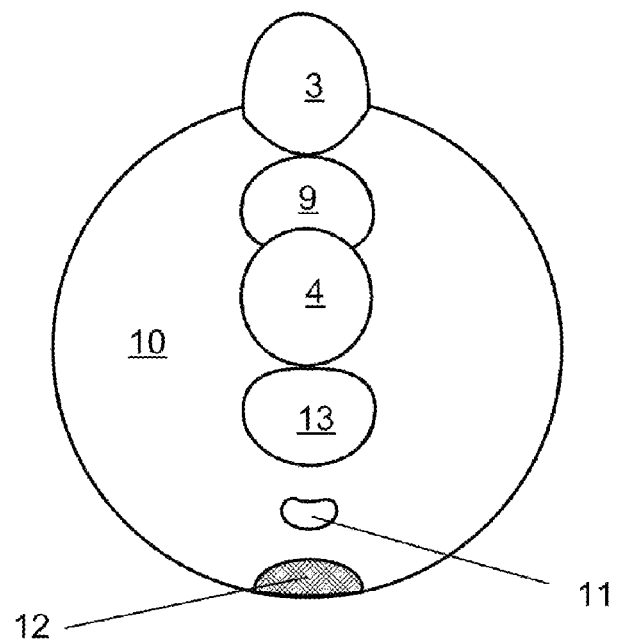
FIG. 5 is a left side view of the present invention.

FIG. 5 is a left side view of the present invention identifying the same elements as identified in FIGS. 1 and 2 that are visible from the left side.

Figure 6:
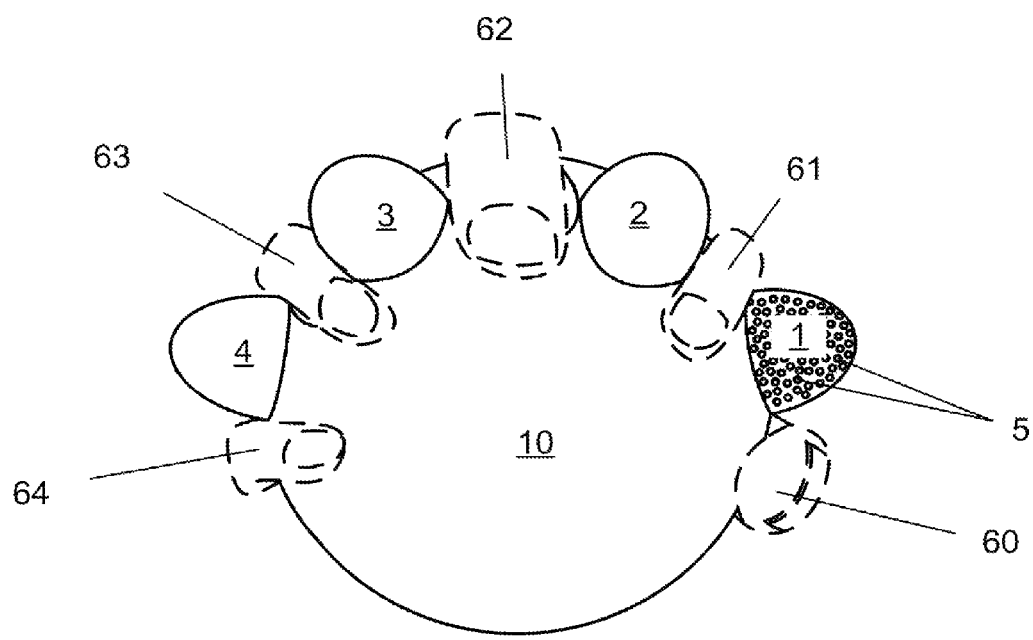
FIG. 6 is front view of the present invention shown gripped in the hand of a user with the top tipped slightly toward the plane of view.

FIG. 6 is front view of the present invention shown gripped in the hand of a user with the top tipped slightly toward the view. The user's hand, shown here in dashed lines as environmental structure, indicates that the user has located nub 1 by the feel of the mini-nubs 5 and the array of the other nubs to one side of it. This person appears to prefer using his/her right hand and has placed his/her right thumb 60 in a position on the opposite side of the nub 1 from the other nubs. (A left handed person would hold the device rotated 180 degrees about its vertical axis, in the other hand.) The position of the right handed person's thumb in this view happens to be on top of the record button 6 (not visible in this view). The other fingers will naturally fall into position as shown, with the index finger on top of the stop button 7 (not visible in this view), the middle finger on top of the play button 8 (not visible in this view), the ring finger on top of the fast forward button 9 (not visible in this view), and the little finger on top of the rewind button 13 (not visible in this view).

Figure 7:
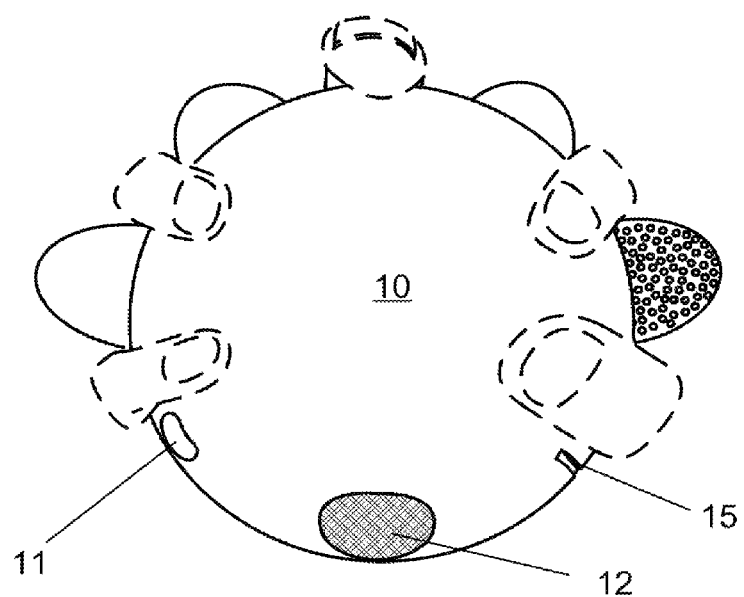
FIG. 7 is a front view of the present invention shown gripped in the hand of a user with the top tipped slightly away from the plane of view.

FIG. 7 is a front view of the present invention shown gripped in the hand of a user with the top tipped slightly away from the view. This view shows, importantly, that the delete button 11 cannot be pressed without a deliberate motion of the little finger further counterclockwise around the body 10. It also shows that in normal use, the speaker grille 12 is positioned on the invention so as not to be obstructed by the user's hand.

In the invention as depicted, the bases of all of the nubs and the peripheries of all of the buttons are substantially round. This is only evident in FIGS. 1 and 3, in which only the play button 8 and the speaker grille 12 appear round because they are viewed at an angle normal to the surface of the body 10. At other angles, therefore, these features may take on an ovoid shape or a kidney shape as shown. The port 15 will generally have a rectangular shape peculiar to its electronic function.

The function buttons 6-9, and 13 may be oval if, as described below, the distance between the nubs separating them is less than 1;2 inch.

The optimum ranges of dimensions for the device, producing an unexpectedly superior result over significant deviations therefrom, are:

the body 10 is substantially spherical with a great circle diameter of 2.25 inches;

the nubs 1-4 are 7/16 inch diameter by ½ inch high separated by ½ inch spacing;

the record, stop, play, fast forward and rewind buttons 6-9 and 13 should be spaced with their centroids 60 degrees apart from each other along the great circle upon which their centroids lie, and should be at least ½ inch wide as measured along the great circle, or, if this width is narrower than ½ inch because the dimensions of the body and nubs do not allow it, the diameter of these buttons perpendicular to the great circle should be at least ½ inch;

the delete button 11 should be ¼ inch in diameter, with its centroid spaced 30 degrees from the centroid of the rewind button along the great circle;

the speaker grille 12 should be diametrically opposed to the play button 8 along the great circle, and should be ½ inch in diameter; and the port 15 should have its centroid spaced 30 degrees from the centroid of the record button 6.

Also optimal is that the body and nubs should be made of semi-rigid (i.e., deformable by hand pressure) elastic material (e.g., rubber). One or more bright colors is also desirable to assist persons with some ability to see.

The scope of this invention, however, is meant to include variations in the shapes and dimensions shown, so long as the principal features described above, enabling quick positioning of the fingers and easy access by feel to the features and related function buttons, are retained.

It is also intended, within the scope of this invention, that it comprise either a compartment for batteries, with a door (not shown) accessible from the surface of the body 10, or a jack for an external power source (not shown) embedded in the surface of the body 10, or both.

The invention claimed is:

1. An audio recorder and player apparatus, comprising:
   a digital audio recording and playback module encased in a shaped container;
   the shaped container comprising
      a spheroidal surface having an equatorial circle;
      at least four nubs;
         each nub having a base intersecting with the surface along the equatorial circle, and a height above the surface;
         the base of each of the at least four nubs being separated from the base of an adjacent nub by a distance;
      control buttons and a speaker positioned on the surface;
         a first nub of the at least four nubs being distinguishable from the other nubs by a covering of mini-nubs over a portion of the surface of the first nub;
         a first nub being defined as one of the two nubs having only one other nub proximate to it, followed by a first space, a second nub, a second space, a third nub, a third space, and a fourth nub.

2. The apparatus of claim 1, in which:
   said first space, said second space and said third space contain a first control button, a second control button, and a third control button, respectively.

3. The apparatus of claim 2, in which:
   said first control button is a stop button;
   said second control button is a play button;
   said third control button is a fast forward button;
   a rewind button is placed proximate to said fourth nub along said equatorial circle;
   a record button is placed proximate to said first button along said equatorial circle and opposite to the stop button;
   a delete button is located along said equatorial circle; and
   said speaker is located along said equatorial circle.

4. The apparatus of claim 3, in which:
   at least one port for transfer of electrical impulses into the apparatus is located on said surface.

5. The apparatus of claim 4, in which:
   said electrical impulses are taken from the list of:
   (a) power to drive said module;
   (b) sound recordings to store in said module; and
   (c) both power to drive said module and sound recordings to store in said module.

6. The apparatus of claim 5, in which:
   said delete button is smaller than said rewind button.

7. The apparatus of claim 6, in which:
   said delete button is proximate to said rewind button.

8. The apparatus of claim 7, in which:
   said speaker is located approximately diametrically opposite on said spheroidal surface to said play button.

9. The apparatus of claim 8, in which:
   said port is a USB port, located approximately along said equatorial circle between said record button and said speaker.

10. The apparatus of claim 9, in which:
    said shaped container is comprised of resilient elastic material.

11. The apparatus of claim 10, in which:
    said distance and said height are approximately 0.5 inches;
    said base of each of said nubs is elliptical, having a major diameter of approximately 7/16 inch;
    said equatorial circle has a diameter of approximately 2.25 inches;
    said record, stop, play, fast forward and rewind buttons have diameters of approximately ½ inch; and
    said delete button is approximately ¼ inch in diameter.

12. The apparatus of claim 10, in which:
    the center of said first nub is separated from the center of said record button along said equatorial circle by an angle of approximately 30 degrees;
    the center of said stop button is separated from the center of said first nub along said equatorial circle by an angle of approximately 30 degrees;
    the center of said second nub is separated from the center of said stop button along said equatorial circle by an angle of approximately 30 degrees;
    the center of said play button is separated from the center of said second nub along said equatorial circle by an angle of approximately 30 degrees;
    the center of said third nub is separated from the center of said play button along said equatorial circle by an angle of approximately 30 degrees;
    the center of said fast forward button is separated from the center of said third nub along said equatorial circle by an angle of approximately 30 degrees;
    the center of said fourth nub is separated from the center of said fast forward button along said equatorial circle by an angle of approximately 30 degrees; and the center of said rewind button is separated from the center of said fourth nub along said equatorial circle by an angle of approximately 30 degrees.

13. An audio recorder and player apparatus, comprising:
a digital audio recording and playback module encased in a spheroidal container;
the container being made of resilient elastic material, and having:
a surface;
a great circle;
a row of four nubs projecting radially upward from the surface along the great circle with spaces therebetween;
the nubs each having a nub surface;
the nub surface of the first nub in the row of four nubs having a different feel from the other nub surfaces;
a stop button proximate to the first nub along the great circle;
a second nub proximate to the stop button along the great circle;
a play button proximate to the second nub along the great circle;
a third nub proximate to the play button along the great circle;
a fast forward button proximate to the third nub along the great circle;
a fourth nub proximate to the fast forward button along the great circle;
a rewind button proximate to the fourth nub along the great circle;
a delete button proximate to the rewind button along the great circle;
a record button proximate to the first nub and opposite the stop button along the great circle;
a speaker approximately diametrically opposite on the great circle to the play button; and
an electrical port positioned along the great circle.

14. The apparatus of claim 13, wherein:
the spaces between said four nubs are so dimensioned as to allow a user to press the stop, play, and fast forward buttons with the forefinger, middle finger, and ring finger respectively without removing his/her hand from the apparatus.

15. The apparatus of claim 14, wherein:
said record button is so positioned proximate to said first nub as to allow a user to press it with his/her thumb without removing his/her other fingers from the apparatus; and
said rewind button and said delete button are so positioned proximate to said fourth nub as to allow a user to press them with his/her little finger without removing his/her other fingers from the apparatus.

16. The apparatus of claim 15, wherein:
said rewind button and said delete button are so shaped as to be differentiable from each other by feel.

* * * * *